Nov. 26, 1940. G. T. HART, JR 2,222,615
UTILIZATION OF ELECTROSTATIC FIELDS
Filed March 9, 1939
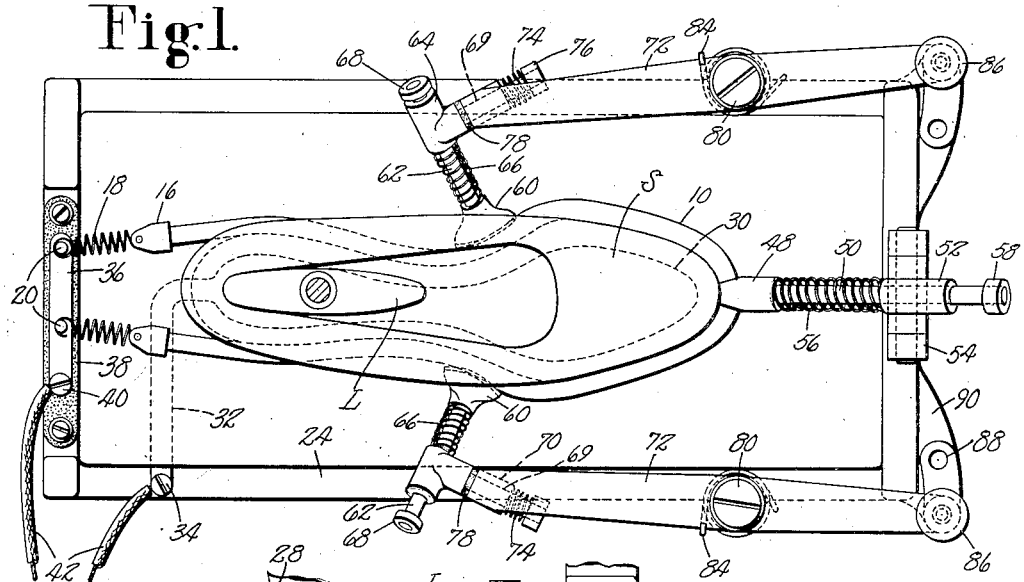
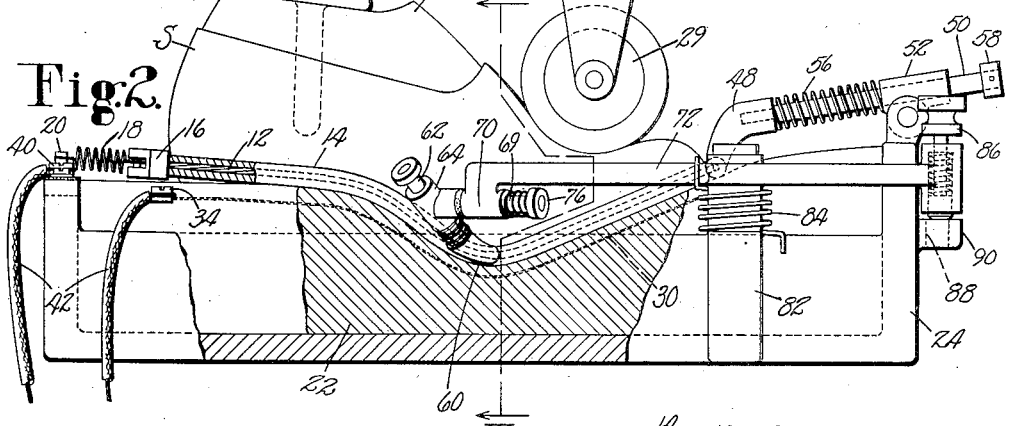
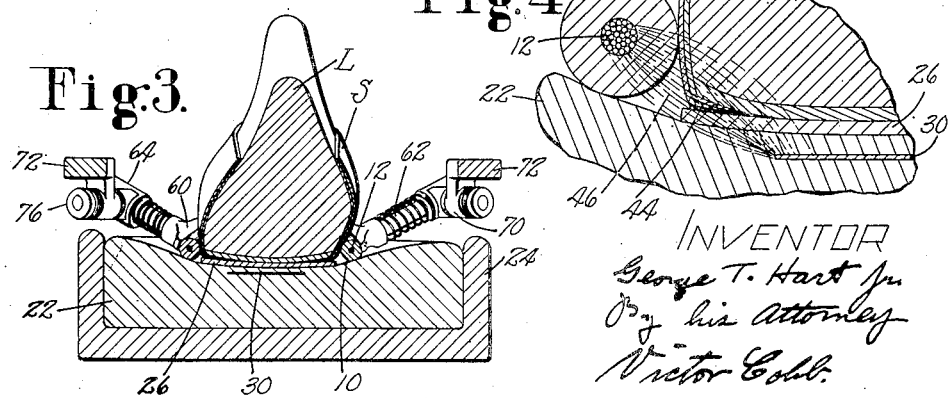
INVENTOR
George T. Hart Jr
By his Attorney
Victor Cobb Patented Nov. 26, 1940

2,222,615

UNITED STATES PATENT OFFICE 2,222,615

UTILIZATION OF ELECTROSTATIC FIELDS

George T. Hart, Jr., Lynn, Mass., assignor to United Shoe Machinery Corporation, Borough of Flemington, N. J., a corporation of New Jersey Application March 9, 1939, Serial No. 260,757

26 Claims. (Cl. 12—33)

This invention relates to methods of and apparatus for utilizing electrostatic fields. It has been illustrated herein in its specific application to the adhesive attachment of outsoles to shoes.

In the utilization of electrostatic fields for the treatment of specific articles, as by the production of heat therein, it is common to provide a condenser made up of a pair of electrodes between which a portion of the article may be positioned. With many articles which are solid, it is only possible to position the electrodes on the outside of the article and, with hollow articles, it is not always convenient to position an electrode within the article. The efficient utilization of a high frequency electrostatic field for the treatment of articles, requires that the electrodes shall be so positioned with respect to the article, that uniform distribution of the field through the area to be treated is secured.

From one aspect, therefore, the invention resides in an improved condenser having electrodes especially adapted for association with the article to be treated.

In the attainment of this object, a feature of the invention resides in a condenser comprising a plate electrode having an outline conforming, in a general way, to the shape of a field which it is desired to produce and a second electrode comprising an elongated flexible strand adjacent to a margin of the first electrode and capable of being given a conformation best adapted for the article to be treated. As illustrated, means are provided for drawing the flexible electrode close about a portion of the article and means are also provided for pressing the electrode against a side portion thereof to bend the electrode into a position better to cooperate with inwardly curved portions.

In the manufacture of shoes, the adhesive attachment of soles to the shoes has long been practiced. Commonly, the adhesive has been applied to the bottom of the shoe and to the attaching surface of the sole and the two have been brought together with the cement in a tacky or activated condition, whereupon pressure has been applied to hold the sole firmly in engagement with the shoe and this pressure has been maintained long enough to allow the adhesive to set. The activation of certain adhesives may be effected by means of heat, in which case they are commonly spoken of as thermoplastic. According to one procedure, this heat may be supplied by passing an electrostatic field, produced by high frequency current, through the bottom portion of the shoe, thereby creating heat in the layer of cement itself without heating up the shoe to any substantial extent. This method is advantageous because the sole and shoe may be associated with one another while the cement is in a non-tacky condition, thus enabling exact positioning of the sole and the easy handling of the parts. After this, when the sole and shoe have been clamped together, heat may be applied to the cement to activate it, without disturbing the position which the parts have assumed. It has been proposed to pass this field through the bottom portion of the shoe by having an electrode associated with the bottom of the last and positioning another electrode adjacent to the outer surface of the sole. If the electrode on the last is not insulated from the shoe, however, sparking may occur, which would burn the leather, and if the last must be provided with an insulated electrode, then the shoe manufacturer must either discard his present equipment and provide himself with a new set of lasts, or else the present equipment must be rebuilt for the purpose.

With this in mind, another important object of the invention resides in an improved method of sole attaching by adhesive in accordance with which the marginal film of adhesive is activated by an electrostatic field set up entirely outside the shoe and passed through the corner of the shoe along the periphery of the bottom of the shoe.

As illustratively described, this method includes the positioning of a film of dry adhesive between the shoe bottom and the sole to be attached and extending around the margin of the bottom of the shoe. Electrodes are then associated with the outside of the shoe to pass an electrostatic field through the lower corner of the shoe and hence through the film of adhesive to activate it. While the sole is in attaching position pressure will commonly be applied to hold the sole and shoe firmly together during the application of the activating field.

Still another object of the invention is to provide an improved electrode for association with the outside of a shoe to enable treatment of the shoe, such as for the activation of an adhesive used for sole attaching.

In accordance with a feature of the invention, this electrode is in the form of an elongated flexible band and means are provided for bending the electrode to cause it to assume the contour or outline of the shoe bottom, including preferably the inwardly curved portions at the side of the shoe. These means, in the illustrated construction, press the band against the shoe along the inwardly curved shank portions thereof and down into the crease between the supporting pad and the shoe upper.

In accordance with another feature of the invention, the elongated flexible electrode is bent to form a loop within which the shoe may be positioned and means are provided for securing the ends of the electrode, which include means for tensioning it to draw it close about the end of a shoe.

These and other features of the invention will now be described in the following specification, taken in connection with the accompanying drawing, in which Fig. 1 is a plan view of a pad box for supporting a shoe, together with my novel electrode;

Fig. 2 is a side elevation showing abutments engaging the top of the shoe to press it against the sole and showing the position assumed by the electrode during sole attaching;

Fig. 3 is a vertical section on the line III—III of Fig. 2 taken through the forepart of the shoe; and Fig. 4 is a similar detail section on a much larger scale indicating diagrammatically an assumed condition of the electrostatic field produced between the electrodes.

By way of illustration, a flexible elongated electrode 10 has been shown as comprising a conductor cable 12 provided with a cover of insulation 14 and having end pieces 16, to which are attached springs 18 connected to studs 20. Thus, the electrode is formed as a loop into which an end of a shoe S may be inserted against the tension of the springs 18 to draw the electrode closely about an end, for example the toe, of the shoe.

While it will be understood that any other form of shoe support may be provided, there has been shown herein, as one concrete example, a resilient pad 22 supported by means of a pad box 24. This pad 22 is shaped to receive a sole 26 of the shoe S, which is built around a last L, and abutments 28 and 29 are provided for engagement with the upper part of the shoe, it being understood that, upon the production of relative movement of these abutments and the pad, pressure will be exerted to hold the sole closely against the bottom of the shoe. Associated with the upper surface of the pad is an electrode 30. This electrode, which may assume numerous forms, is herein shown as a flexible plate embedded in the upper portion of the resilient pad 22, so that it is adjacent to the tread surface of the sole of the shoe but is insulated therefrom. This plate, which has a contour similar to the contour of the shoe, is small enough to lie within the margin of the smallest shoe which may be treated on this particular pad. The electrode 30 has an extension 32 (Fig. 1) provided with a terminal 34 to enable its connection to a source of high frequency current.

The studs 20, to which the springs 18 are connected, are provided on a plate 36 insulated from the pad box by a strip 38 of insulating material, by means of which this plate 36 is attached to the box 24. The plate 36 has a terminal 40. Leads 42 are provided to connect the terminals 34 and 40 to opposite sides of a source of high frequency current such as an oscillator.

It will be understood that, in the attachment of soles to shoes by means of an adhesive, the latter is applied in a marginal stripe extending from approximately the heel breast line around the forepart of the shoe and along the shank portion thereof. If, then, the electrode 10 is caused to rest against the outer side of the shoe upper along the lower margin thereof, an electrostatic field will be produced between electrodes wholly outside of the shoe and the field will extend between this electrode 10 and the electrode 30 and will pass through the marginal portion of the attaching surface of the sole, where the bands of cement 44 lie and this field may assume a density and characteristic shape such as that indicated by the dotted lines 46 in Fig. 4. From this, it will be seen that no exact relation between the electrode 10 and the side of the shoe is necessary, so that the arrangement illustrated will function equally well with various sizes of shoes. It is desirable, however, that the electrode 10 be brought into close association with the sides of the shoe upper and be held adjacent to the sole crease between the sole and the upper.

To this end, a mid portion of the electrode 10 is supported by a finger 48 on one end of a bar 50 slidable in a sleeve 52, which is pivoted in lugs 54 attached to the pad box 24. The finger 48, which is made of insulating material, surrounds the cable of the electrode 10. A spring 56 pushes the rod 50 and hence the electrode toward the toe end of the shoe and, when the shoe is inserted in the looped electrode, this is done against the compression of the spring 56 and the tension of the springs 18. On the rod 50 is a head 58 to limit its movement under the influence of the spring 56 when no shoe is in place.

To bring the side portions of the looped electrode 10 into the inwardly curved shank portions of the shoe and down to follow the heightwise contour of the shoe bottom, I have provided pressers 60 which rest against the insulated electrode and are mounted upon rods 62 slidably positioned in sleeves 64. Surrounding these rods are compression springs 66 and the rods are provided with heads 68 to limit their downward movement. The sleeves 64 have pivot pins 69 mounted to turn in the depending ends 70 of arms 72, and compression springs 74 are inserted between the heads 76 of these pivots and the depending ends 70 to hold the sleeves 64 against washers 78, which provide brakes against too easy movement of the sleeves 64. This arrangement permits the operator to adjust the positions of the pressers 60, as may be needed for any particular shoe, and at the same time holds each presser in the position which it last occupied, so that but little change will be necessary when another shoe is inserted within the looped electrode 10 for treatment therein.

The arms 72 are swingably mounted upon the pad box 24 by means of pivot screws 80 entering posts 82 formed upon the outer sides of said box. Coil springs 84 are associated with these posts and arranged to urge the arms inwardly to force the pressers 60 against the electrode, thus pressing the electrode inwardly and downwardly into the crease between the pad 22 and the shoe upper (Fig. 4). When it is desired to remove one shoe and substitute another, the arms 72 may be rotated against the force of these springs 84 and held in an inoperative position by means of spring pressed latches 86 engaging apertures 88 provided in lugs 90 extending out from the pad box.

While the invention has been described herein in its particular application to sole attaching, it will be understood that it is not limited to such a use and may be applied to the treatment of any object where heat is to be set up, and especially to any case in which it is desired to pass an electrostatic field through the lower marginal portions of a shoe.

In the operation of the illustrated machine, assuming that the arms 72 have been moved to their inoperative positions and are held there by the latches 86, a sole will be positioned upon the pad above the electrode 30, whereupon the shoe will be inserted in the looped electrode 10 and moved to the right in Fig. 1 against the strength of the springs 18 and 56 to bring it into the desired relation to the sole. This will cause the electrode to be closely wrapped around the forepart of the shoe. The swinging arms 72 will then be released by withdrawing the latches 86 and the pressers 60 will be adjusted into contact with the electrode 10 to press the sides of it down and in against the inwardly curved shank portions of the shoe adjacent to the sole crease anad pressure will be applied through the pad 22 and the abutments 28, 29 to hold the sole firmly in contact with the shoe. Thereupon, a high frequency current will be passed through the leads 42 and an electrostatic field set up passing through the lower portion of the shoe to activate the adhesive 44 for attaching the sole to the shoe. Substantially immediately after the electricity has been turned off, the heat will disappear and the thermoplastic adhesive will set to provide a permanent bond. This being accomplished, pressure will be removed and the treated shoe taken out of the machine and another substituted.

Having described my invention, what I claim as new and desire to secure by Letters Patent of the United States is:

1. A condenser for producing an electrostatic field for the treatment of an article, said condenser comprising a plate electrode having a marginal outline conforming in a general way to the shape of an electrostatic field which it is desired to produce, and another electrode which includes an elongated flexible strand positioned adjacent to but spaced from the margin of the first electrode to permit the interposition of at least a portion of the article to be treated, the contour of the flexible electrode member being approximately that of the contour of a portion of the article to be treated.

2. A condenser for producing an electrostatic field for the treatment of an article, said condenser comprising an electrode in the form of a plate having an outline conforming in a general way to the shape of a field which it is desired to produce and a second electrode suitably spaced from said plate and at a different level and comprising an elongated flexible member adjacent to the periphery of said plate, and means for causing said flexible electrode to assume a position spaced from but substantially parallel to the edge of said plate, the details of which position are determined by the configuration of the article which is to be treated in the field of said condenser.

3. In an apparatus for treating articles in an electrostatic field, a support for an article to be treated, an elongated flexible electrode movable with respect to said support, and means attached to said support for pressing said electrode against a side portion of the article carried by the support.

4. In an apparatus for treating articles in an electrostatic field, a support for the work to be treated, an electrode comprising an elongated flexible strand bent to form a loop, and means for securing the ends of said member to said support including means for tensioning it to draw it close about a portion of an article to be treated.

5. In an apparatus for treating articles in an electrostatic field, a flexible electrode comprising an elongated conductor bent to form a loop within which an article to be treated may be positioned, means for supporting a mid portion of said electrode, and pushing means for causing said electrode to engage a portion of said article.

6. In an apparatus for treating an article in an electrostatic field, a support for an article having convex and concave side portions, an insulated flexible elongated electrode adapted to be associated with the side portions of said article, and means for bending said electrode to cause it to assume approximately the shape of said convex and concave portions.

7. That method of attaching soles to shoes which consists in bringing together a sole and the bottom of a shoe between which there has been positioned a film of adhesive extending around the margin of the bottom of a shoe, subjecting said adhesive to the action of an electrostatic field derived from electrodes positioned entirely outside of the shoe and one of which is positioned adjacent to the tread surface of the sole of the shoe, and pressing together said outsole and shoe until the adhesive is set.

8. That method of attaching soles to shoes, which consists in providing a film of adhesive between the sole of the shoe and extending around the margin of the shoe bottom, and activating said adhesive by passing an electrostatic field through the lower corner of the shoe from the outside of the upper to the outside of the sole to activate said band of adhesive.

9. That method of attaching outsoles to shoes, which consists in bringing together an outsole and a shoe between which there has been interpositioned a film of adhesive extending around the margin of the bottom of the shoe, passing an electrostatic field from an electrode positioned adjacent to the outer surface of the side of the shoe upper to another electrode associated with the outer side of the shoe bottom and pressing together said outsole and shoe.

10. That improvement in the method of sole attaching by adhesive, which consists in bringing together a sole and the bottom of a shoe between which there has been positioned a film of adhesive, wrapping a flexible insulated electrode around the side portions of a shoe, passing an electrostatic field through the shoe between said electrode and another electrode positioned beneath the sole, and holding the sole against the shoe until the adhesive is set.

11. That improvement in methods of attaching soles, which consists in bringing together a lasted shoe and an outsole between which there has been positioned a film of adhesive extending around the margin of the bottom of the shoe, positioning the two upon a pad having an electrode, associating another electrode with the lateral portions of the outside of the shoe, pressing the shoe against the pad and activating the adhesive by creating an electrostatic field between said electrodes through said film to activate it.

12. In a shoe treating machine, a flexible pad, an insulated elongated flexible electrode adapted to be associated with the sole crease around the sides of a shoe resting on said pad, and means for bending said electrode to cause it to assume the contour of an inwardly curved portion of the side of the shoe.

13. In a shoe treating machine, a flexible elongated electrode formed as a loop within which an end portion of a shoe may be positioned, tensioning means connected to an end of the electrode, and means for pressing said electrode against a side portion of the shoe.

14. In a shoe treating machine, a flexible elongated electrode formed as a loop within which an end portion of a shoe may be positioned, means for supporting a mid portion of said electrode, tensioning means connected to an end of the electrode, and means for pressing said electrode against a side portion of the shoe.

15. In a shoe treating machine, a support for a shoe, a flexible elongated electrode adapted to be associated with the side portions of a shoe and having a mid portion connected to one part of said support and end portions connected to another part of said support, one or more of said connections being resilient, an arm on said support associated with a side portion of said electrode and adapted to press the electrode against the side of the shoe, and means urging said arm in one direction.

16. In a shoe treating machine, a support, an elongated flexible electrode having the form of an open loop, the ends of which are attached to said support, resilient means tensioning said electrode, and means for resiliently pressing the side portions of said loop against the sides of the shank portion of a shoe positioned within the loop.

17. In a shoe treating machine, a support, an elongated flexible electrode having the form of an open loop, the ends of which are attached to said support, resilient means tensioning said electrode, an arm movably mounted on said support adjacent to a side portion of said looped electrode, and resilient means urging said arm toward a shoe positioned in the loop.

18. In a shoe treating machine, a support, an elongated flexible electrode having the form of an open loop, the ends of which are attached to said support, resilient means tensioning said electrode, an arm movably mounted on said support and engaging a side portion of said loop, and means for holding said arm in a position which permits the loop to spring away from the side of the shoe.

19. In a shoe treating machine, a support, a flexible elongated electrode, a member movably mounted on the support, a slide in said member engaging the electrode, and resilient means urging said slide toward the electrode.

20. In a shoe treating machine, a support, a flexible electrode adapted to be brought into engagement with the side of a shoe, an arm movably mounted on the support, resilient means urging one end of said arm toward the electrode, a member pivoted on the arm, a pusher slidably mounted in said member, and resilient means urging said pusher toward the electrode.

21. In a shoe treating machine, a support, a flexible electrode adapted to be engaged with a shoe, means for urging the electrode against the shoe comprising an arm movably mounted on the support, resilient means urging said arm toward a shoe on the support, and a latch for holding said arm against the tension of said resilient means.

22. In a shoe treating machine, a support for a shoe, a flexible electrode associated therewith and adapted to be brought into engagement with a shoe, an arm movably mounted on the support, a spring urging one end of said arm toward the shoe, a pusher resiliently mounted on said arm and arranged for turning movement around a substantially horizontal axis, and means resisting said turning movement.

23. In a sole attaching machine, a support for a sole and shoe, an abutment cooperating with said shoe, an electrode underlying said sole, another electrode positioned alongside said shoe closely adjacent to the upper near the sole, and means for causing relative movement between the abutment and the support to apply pressure to the sole.

24. In a sole attaching machine, a support for a sole and shoe, a cooperating abutment engaging the shoe to hold it against the sole, a flexible electrode looped around the forepart of the shoe and held adjacent to the crease between the upper and the sole, another electrode positioned beneath the sole, and means for causing relative movement of the abutment and the support to press the sole against the shoe.

25. In a sole attaching machine, a resilient shoe supporting pad upon which a sole and shoe to be attached may be positioned, a cooperating abutment engaging the shoe to hold it against the sole, a flexible electrode looped around the shoe, means for holding said electrode in the crease formed between the pad and the shoe, another cooperating electrode positioned beneath the sole, and means for causing relative movement of the abutment and the pad to press the sole against the shoe.

26. In a sole attaching machine, a resilient shoe supporting pad, a support in said pad, an electrode associated with the upper portion of said pad and adapted to underlie a shoe resting on the pad, a flexible elongated electrode forming a loop above the pad and attached to the support by means including a tension spring permitting the electrode to be drawn around a shoe positioned on the pad, and means for exerting pressure against a shoe supported on said pad within said loop.

GEORGE T. HART, Jr.